United States Patent [19]

Bouffard et al.

[11] Patent Number: 4,523,423

[45] Date of Patent: Jun. 18, 1985

[54] CRADLE FOR A TWISTING MACHINE

[75] Inventors: Jean Bouffard, Lachine; André Dumoulin, Montagnes; Edgar K. Lederhose, Chateauguay, all of Canada

[73] Assignee: Northern Telecom Limited, Montreal, Canada

[21] Appl. No.: 565,761

[22] Filed: Dec. 27, 1983

[51] Int. Cl.[3] .......................... D07B 7/06; B60T 13/04; B65H 59/04

[52] U.S. Cl. .......................................... 57/59; 57/64; 57/127.5; 188/75; 188/166; 242/156; 242/156.2

[58] Field of Search ..................... 57/59, 127.5, 127.7, 57/65, 58.32, 58.52, 66.5, 64; 242/156.2, 156, 45; 188/72.9, 74–76, 77 R, 166

[56] References Cited

U.S. PATENT DOCUMENTS

| | | | |
|---|---|---|---|
| 2,877,620 | 3/1959 | Blaisdell | 57/59 X |
| 4,375,875 | 3/1983 | Richardson | 242/156.2 |
| 4,423,588 | 1/1984 | Garcia | 57/127.5 |
| 4,491,206 | 1/1985 | Richardson | 188/166 |

FOREIGN PATENT DOCUMENTS

| | | | |
|---|---|---|---|
| 678401 | 6/1939 | Fed. Rep. of Germany | 57/59 |

*Primary Examiner*—John Petrakes

*Attorney, Agent, or Firm*—R. J. Austin

[57] ABSTRACT

Cradle for a twisting machine with a brake for a reel spindle comprising a brake drum and first and second brake shoes operable in succession. The in succession operation is achieved with a brake release link which pivots about either of two relatively offset axes. A component of load is placed upon the release link initially in one direction to cause it to pivot around one of the axes and operate the first brake shoe. Pivoting then takes place around the other axis to operate the second brake shoe.

7 Claims, 6 Drawing Figures

CRADLE FOR A TWISTING MACHINE

This invention relates to cradles for twisting machines for filamentary material.

High speed twisting machines are known for twisting together two lengths of filamentary material, e.g. insulated telecommunications conductors. In one form of twisting machine for twisting two insulated conductors into a twisted pair with conductors of for instance, 22, 24 or 26 awg, the two lengths of insulated conductors are held upon reels which are mounted upon reel shafts which in turn are rotatably mounted upon opposite sides of a cradle to allow for rotation of the two reels. To twist the lengths of conductor together, each length is fed from its reel, around a rotatable pulley held with its axis stationary relative to the axis of the reels shafts, and then around a tensioning pulley. The two lengths are then brought to side-by-side positions in which they pass from the cradle under a pulley and then upwardly along a curved flyer which rotates about a vertical axis with its sweep encompassing a space containing the two reels. By this means, the two lengths receive a double twist e.g. at a flyer speed of 1,200 rpm, the conductors have 2,400 twists per minute.

The tension pulley for each reel is mounted at one end of the arm which is pivotally mounted concentrically with the reel spindle. Conventionally, a disc brake arrangement is employed to maintain predetermined tension in the conductor length being drawn from each reel and around its tensioning pulley. When the conductor length is under tension, the pulley and arm are pivoted downwards to release the brake and reduce the resistance to rotation of the reel and, when tension is relaxed, the arm is pivoted upwards under spring pressure to apply the brake. In the conventional arrangement, a torsion spring is concentrically arranged with the arm and the reel spindle and, in a normal spring position, the disc brake is held engaged to prevent rotation of the spindle. Concentrically within the spring is a ball race with helical tracks for the balls. Upon the pulley and arm being moved downwards, the spring is torsioned to rotate the outer housing of the race which moves the outer housing axially by virtue of the movement of the balls along their helical tracks. This axial movement removes an axial end load upon the components of the disc brake, whereby braking pressure is removed.

To overcome problems associated in use of this conventional disc brake arrangement, a new brake design for a cradle has been suggested. This is as described in U.S. Pat. No. 4,375,875 entitled "Cradle For A Twisting Machine" and granted Mar. 8, 1983 to W. L. Richardson. In the brake arrangement described in this patent, two brake discs are mounted at the ends of brake arms operated by a brake operating means comprising a brake release linkage operable by movement of the tensioning pulley. This structure avoids the use of the helical ball tracks as used in the conventional disc brake arrangement.

In both of the above constructions, the braking force is applied and removed by movement of both brake discs simultaneously. There is therefore a sudden application and release of braking pressure, instead of a varying and small braking load, so that substantially constant conductor tension is impossible to achieve at fast feed speeds. While such variation in tension may be accommodated without difficulty in a conventional twisting machine in which two lengths of conductor after twisting are wound onto a further reel, in some apparatus the avoidance of substantially constant tension may lead to problems in operation. One such apparatus is described in a copending application, application Ser. No. 565,634 filed concurrently herewith, and entitled "Forming Cable Core Units" in the names of J. Bouffard, A. Dumoulin and M. Seguin. This apparatus is provided for making a stranded core unit of twisted pairs of conductors in which a plurality of twisting machines are provided. These machines twist pairs of conductors which are then fed together to a downstream stranding machine which strands together the twisted pairs of conductors. Because of the high tensions produced in the twisting operation, the apparatus described in the aforementioned application also includes a tension equalizing means and a tension reducing means which enable the tensions in the twisted pairs to be reduced as they approach the stranding machine, so that the stranding machine is able to deal effectively with the stranding operation. In such an apparatus, any undue tension in any of the twisted pairs should be avoided during or after the twisting operation and any large variation in tension in any twisted pair of conductors should also be avoided. Hence, in this apparatus of the other application, it is advisable to avoid the use of any twisting machine having a tensioning arrangement in which the braking force is applied and removed by two brake discs simultaneously. It would be advisable, therefore, to devise a cradle for a twisting machine in which braking pressure is applied and reduced in smaller increments than is possible with presently known machines.

In U.S. patent application Ser. No. 470,250 entitled "Braking Device" and filed on 28 Feb. 1983 in the name of W. L. Richardson, and now U.S. Pat. No. 4,491,206, there is described a braking device which is used in cable production. However, this particular braking device is used for the control of tension in a taping apparatus for applying tape as a wrapping around a core for a cable. This particular braking device has a mechanism which applies and removes the braking pressure of two brake shoes at different times from a brake drum. Unfortunately, this mechanism occupies a large area of the taping machine and would be completely unsuitable for use in a restricted region, such as is required upon a cradle of a twisting machine where non rotatable parts need to be disposed within the sweep of the flyer bar.

The present invention provides a cable for a twisting machine for filamentary material comprising:

a reel spindle for a reel of filamentary material rotatably mounted upon a support, and a tensioning device for the material as it is drawn from the reel, the tensioning device comprising:

a brake drum rotatable with the spindle and having an inner and outer cylindrical brake surface;

first and second brake shoes disposed for braking engagement, the first shoe with the inner and the second shoe with the outer brake surface, the shoes mounted upon first and second pivotal brake arms respectively to move the shoes towards and away from their braking surface;

a rotatable tensioning pulley;

biassing means to urge the pulley and its axis in one direction of movement and to urge pivotal movement of the first and second brake arms to hold the shoes normally in brake engaged positions with the brake surfaces, the pulley being movable in the opposite direction against the biassing means; and a brake release actuator operably disposed between the pulley and the arms and comprising a brake release link pivotally movable about either of two relatively offset axes, and a brake operating link, the actuator operable when the pulley moves in said opposite direction and with the links connected and relatively inclined to subject the release link to a component of load causing it to pivot primarily about a first of the offset axes to move a first arm and its brake shoe from its brake engaged position and then to pivot primarily about the second axis to move the other arm and its brake shoe from its brake engaged position.

With one of the brake shoes located within the confines of the brake drum, the tensioning device is as compact as possible. Also the arms are placed closely together in a preferred arrangement where the brake shoes lie in opposed positions, one on the inside and the other on the outside of the brake drum. Further to this, the fact that the links are relatively inclined so that the brake operating link places a component of load on the release link to cause it to move primarily about one of the axes before the other, avoids the necessity of using any form of additional biassing means to enable such a pivotal movement to take place. Hence the total structure is simplified as far as possible, thereby enabling the design to be located within the sweep encompassed by a flyer bar of the twisting machine.

One embodiment of the invention will now be described by way of example with reference to the accompanying drawings in which.

Figure 1:
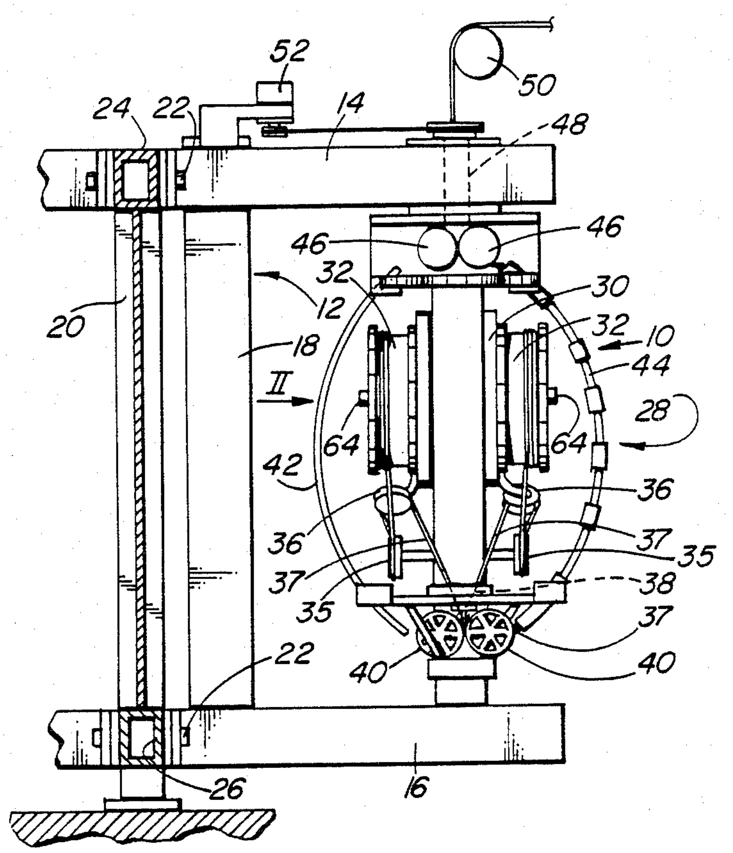
FIG. 1 is a side elevational view of a twisting machine.

In the embodiment as shown by FIG. 1, a twisting machine 10 is one of a plurality of similar machines which are arranged in banks of machines and forms part of an apparatus as described in a copending patent application Ser. No. 565,634 entitled "Forming Cable Core Units" and filed concurrently herewith in the names of J. Bouffard, A. Dumoulin and M. Seguin. As described in that application, apparatus is provided for making a stranded core unit of twisted pairs of conductors in which twisting machines twist individually insulated conductors together into their pairs. These twisted pairs are fed to a stranding machine to provide a stranded core or core unit for a cable. In the apparatus described in the aforementioned application, main inventive features concern the inclusion of a tension equalizing means and a tension reducing means for both reducing the tension in the twisted pairs of conductors and for minimizing the differences between the tensions in the pairs before these pairs are passed to the stranding machine. By the reduction of tension and the minimizing of the tension differences, the apparatus enables the stranding and twisting operations to be performed in tandem.

As will be described in this embodiment each of the twisting machines, as exemplified by the twisting machine 10, provides a tensioning device which prevents the sudden application and removal of substantial tensile loads upon the twisted pairs.

As shown by FIG. 1, the twisting machine 10 comprises a rigid sub-frame 12 having upper and lower horizontal frame members 14 and 16, which are secured to a main vertical member 18. This sub-frame is detachably secured to a rigid main frame 20 by four bolts 22, two of which secure the frame member 14 to a box beam 24 and the other two secure the frame member 16 to a box beam 26. The method of attachment of the sub-assembly of the twisting machine and its sub-frame to the main frame is described in greater detail in a copending patent application Ser. No. 565,760 entitled "Apparatus For Twisting Insulated Conductors", filed concurrently herewith in the names of J. Bouffard, A. Dumoulin and O. Axiuk.

The twisting machine 10 also comprises a twisting assembly 28. Each twisting assembly comprises a reel cradle 30 for rotatably holding two reels 32 of insulated telecommunications conductor and a tensioning device 34 (shown in greater detail in the other figures), which is operable to control the rotational speeds of the reels dependent upon tension in the conductors as they are drawn from the reels, around two guide rolls 35 and around dancing rolls or tensioning pulleys 36, one of which forms part of the tensioning device for each reel. The conductors 37 pass from their reels, around the two tensioning pulleys, downwardly through a central aperture 38 in the cradle and then around either of the lower pulleys 40 to pass upwardly along one of two diametrically opposed flyers 42 and 44. The conductors continue around an upper guide pulley 46 to pass upwardly and outwardly from the machine through a central aperture 48 before progressing around a final guide pulley 50 and away from the machine. The construction of the twisting assembly including the two flyers is described in greater detail in copending U.S. patent application Ser. No. 565,635, entitled "Twisting Machine", filed concurrently herewith in the names of J. Bouffard, A. Dumoulin and O. Axiuk. This particular application deals with the use of a twisting machine having two diametrically opposed flyers and associated guide pulleys for the purpose of twisting conductors insulated with different materials, and also for providing rotational balance and stability to the twistlng assembly. The two flyers and their guide pulleys 40 and 46 are mounted as a rotatable assembly in bearings in the frame members 14 and 16. Each twisting machine is also provided with its own individual electric drive motor 52 secured above the frame member.

Figure 2:
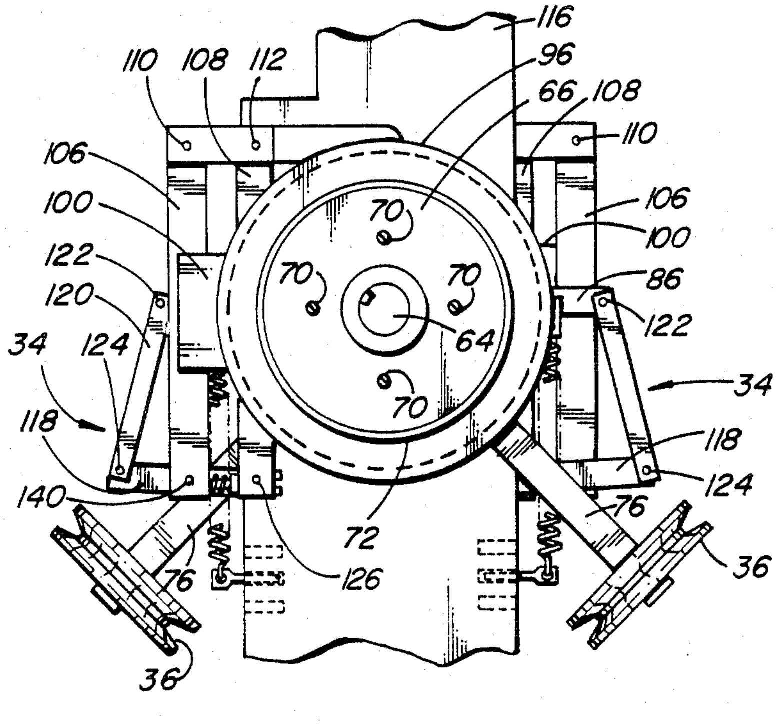
FIG. 2 is a view taken in the direction of arrow II in FIG. 1 showing part of the cradle of the machine and on a larger scale than FIG. 1.
Figure 3:
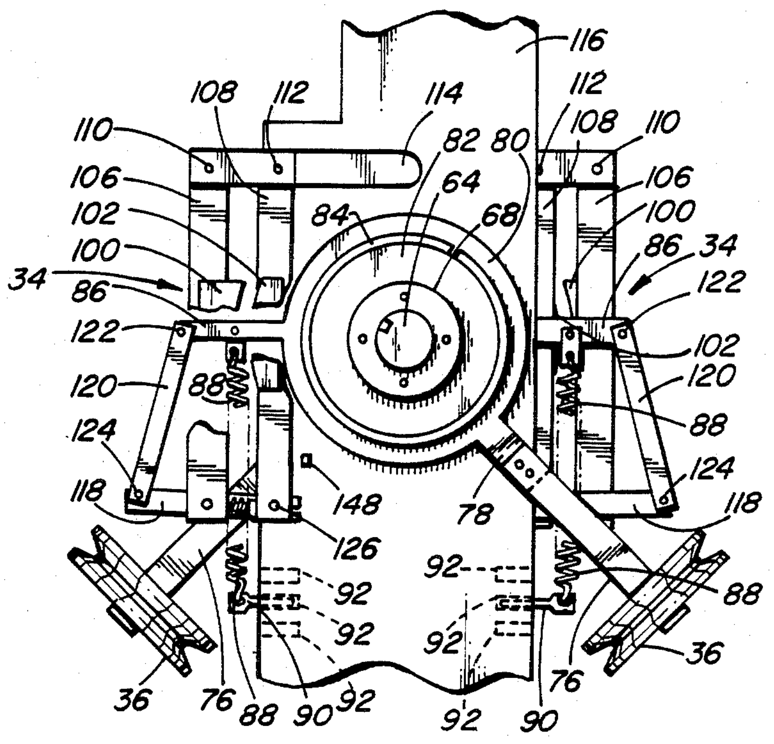
FIG. 3 is a view similar to FIG. 2 with parts of the cradle removed.

As shown in greater detail in FIGS. 2 and 3, at each side of the cradle there is a horizontal reel spindle 64 provided for supporting a reel 32. The tensioning device also comprises a brake drum 66 which is secured concentrically to a flange 68 of the spindle (FIG. 3) by screws 70 (FIG. 2). The brake drum carries a friction engaging means such as is described in copending patent application Ser. No. 565,743, entitled "Cradle For A Twisting Machine" and filed concurrently herewith in the names of J. Bouffard, A. Dumoulin and E. K. Lederhose. This friction engaging means is for frictional engagement with a reel 32 when mounted upon the spindle so as to retain the reel in driving engagement with the drum and the spindle. The friction engaging means comprises an annular friction pad 72 which is mounted upon the brake so as to face along the spindle. Springs between the pad and the drum urge the pad axially along the spindle and cause the pad to frictionally engage the reel 32 for driving it with drum rotation as described in the application entitled "Cradle For A Twisting Machine".

The tensioning device for each spindle 64 is further constructed as follows. With reference to FIGS. 2 and 3, the tensioning pulley 36 is mounted upon the end of a pulley support arm 76 which is secured to a radial extension 78 formed integrally with an annulus 80, which surrounds and is concentric with the spindle 64. This annulus is rotatably received upon a mounting 82, which rotatably carries the spindle 64 within it and the annulus is retained in place by a spring clip 84 which engages within a peripheral groove of the support 82. At a position angularly spaced around the annulus from the extension 78 there is a further extension 86. To this extension is attached one end of a tension spring 88, the other end of which has a pin 90 attached to it. This pin is locatable within any of a plurality of vertically spaced apart pin receiving holes 92, which are provided within a member 94 extending downwardly from the extension 86. Thus the spring 88 is a biassing means which tends to rotate the annulus and thus the pulley 36 in an anticlockwise direction as viewed in the figures, and therefore urges the pulley against insulated conductor being fed around it as the conductor is passed from a reel during a twisting operation. The resistance of the spring is adjustable by moving the pin into any of the holes 92 as indicated and this varies the amount of force required to move the pulley 36 in a clockwise direction. Hence, the tension in the conductor passing around the pulley 36 must vary to move the pulley by a certain amount if the position of the pin 90 is changed. The brake drum has inner and outer brake engaging surfaces 96 and 98. Two brake shoes, 100 and 102 are provided for engagement with the surfaces, the shoes having curved surfaces complimentary to the surface of the brake drum against which they are to be applied. The two shoes are mounted upon two brake arms which lie substantially vertically and in substantially parallel relationship as shown in FIGS. 2 and 3. These arms 106 and 108 are pivoted at upper ends 110, 112, to a horizontal support 114 extending from the central support 116 of the cradle. Because of the location of the brake shoes 100 and 102 extending lengthwise of the arms 106 and 108, then the arms extend behind the flange of the brake drum having the surfaces 96 and 98.

Figure 6:
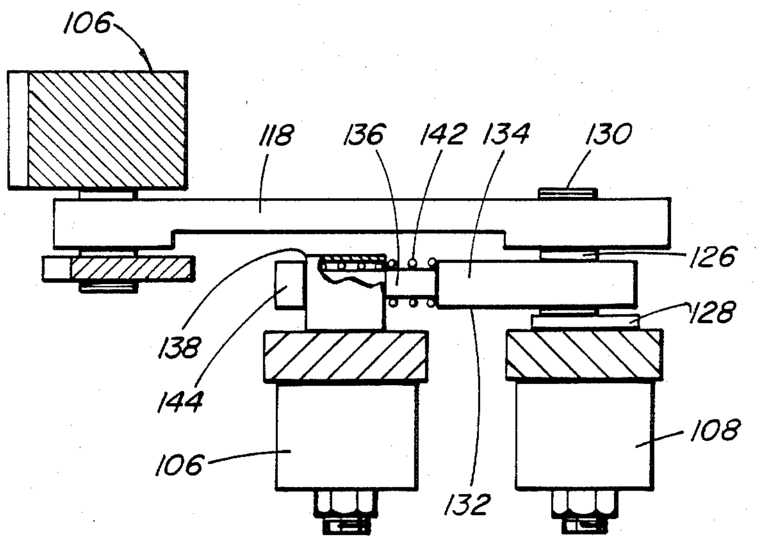
FIG. 6 is a cross-sectional view through the operating parts taken along line VI—VI in FIG. 3.

A brake release actuator is provided for moving the brake shoes out of their normal position in which they engage the surfaces 96 and 98 of the drum. This brake release actuator comprises a brake release link 118. This link, as shown in FIGS. 2, 3 and 6, extends substantially horizontally in the vicinity of the lower ends of the arms 106 and 108. The actuator also comprises a brake operating link 120, which is pivotally mounted at one end 122 to the extension 86 and at the other end 124 to one end of the link 118. As shown in FIGS. 2 and 3, the angle subtended between the two links 118 and 120 is an acute angle. This is to provide a relative inclination of the links so as to subject the release link 118 to a component of load causing it to pivot in a particular fashion as will be described below. Also, as shown, the connection between the links at the lower end 124 of link 120 is at the radially outer position of the links relative to the axis of the spindle 64. With this arrangement, the mechanism forming the actuator lies in close proximity to the brake drum itself, so as to ensure that there is sufficient space to enable rotation of the flyers around the non-rotatable parts of the cradle. The other end of the release link 118 has secured thereto an eccentric pivot pin 126 (see particularly FIG. 6). The pivot pin has a pivot part 128 which is rotatably mounted within the lower end of the arm 108. The pin also has a part 130, which is eccentrically and integrally formed with the part 128 and is of smaller diameter. This part 130 extends through the release link 118 and is secured thereto. The positions apart of the axes of the pin parts 128 and 130 is in the order of approximately 0.25 inches. Thus the release link 118 is pivotally connected to the arm 108 and relative movement between these two elements may take place either around the axis of the part 128 or around the axis of the part 130.

An arm control link is provided for the arm 106. This link 132 has an enlarged end 134 which surrounds and is pivotally mounted upon the part 130 of the pin 126. The other or narrower end 136 extends through a support 138 which is rotatably mounted at the lower end 140 of the arm 106. A compression spring 142 surrounding the part 136 of the link is provided normally to hold the arm 106 away from the arm 108, a distance which is controlled by a head 144 on the link 132, the spring acting between shoulders provided on the support 138 and upon the enlarged end 134.

Figure 4:
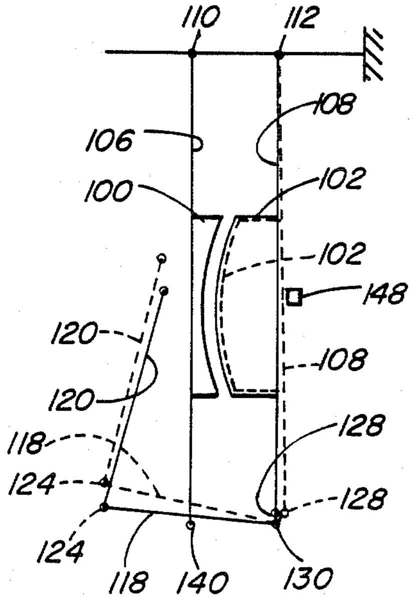
FIG. 4 is a diagrammatic view, on a larger scale than FIG. 2, of the operating parts of a tensioning device of the twisting machine and showing one position of the parts as in FIGS. 2 and 3, and a second chain-dotted position showing a first stage of movement.
Figure 5:
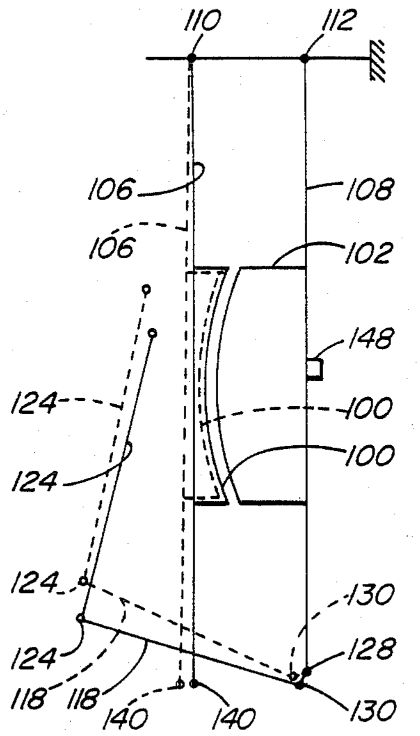
FIG. 5 is a view similar to FIG. 4 showing the first and second stages of movement.

In operation of the twisting machine, and with a reel 32 mounted on each spindle 64, the insulated conductor 37 is fed from each reel around the pulley wheel 36 downwardly through the aperture 38, (during which the conductors converge), around one of the pulleys 40, through one of the flyers and upwardly around one of the pulleys 46 to pass through the aperture 48 and around pulley 50. The normal position of the tensioning device which includes the pulley 36 and the brake release actuator is as shown in FIGS. 2 and 3, i.e. with the brake shoes 102 and 104 held in engagement with the brake drum surfaces by the tension spring 88. This position is also shown in full outline in FIG. 4. As tension in the conductor passing from either reel 32 builds up, it causes the corresponding tensioning pulley 36 to pivot downwards as viewed in FIGS. 2, 3 and 4. This movement, which acts against the tension spring 88, cause the extension 86 and the brake operating link 120 to move upwardly to raise the end 124 of the link 118. Because of the acute angle formed between the two links 118 and 120, the lifting movement upon the link 120 places a component of load upon the link 118 directed upwardly, but towards the axis of spindle 64 as viewed in the figures. As a result of this component of load, the link 118 pivots primarily around the axis of part 130 of pin 126. When viewing the tensioning device structure 34 as represented in FIG. 4, this causes the pivot pin part 128 to move towards the right. This effects pivoting movement of the arm 108 about its top end 112 in an anticlockwise direction, thereby causing the brake shoe 102 to reduce its frictional grip upon the brake drum surface 98. The degree to which this grip is reduced depends upon the tension being applied to the conductor, i.e. it corresponds to the downwards movement of the tensioning pulley 36. If the pull upon the conductor moves the pulley 36 down sufficiently far, then the brake shoe 102 is moved completely away from engagement with the brake drum. Hence the braking effect of the brake shoe 102 is reduced as the demand for the conductor from the reel increases. Upon the brake shoe being completely removed, the arm 108 engages a stop 148 provided upon the cradle support and this prevents the arm 108 moving any further in the anticlockwise direction. The position of arm 108 and corresponding positions of other parts upon engagement with the stop are shown as chain-dotted in FIG. 4. Upon any continued upward movement of the operating link 120, after the arm 108 has reached its limit of movement, then any further rotational movement of the link 118 must occur around the axis of the pin part 128 which can no longer move towards the right as viewed in the figures. Hence the pivot pin part 130 then commences to move towards the left or in a clockwise direction around the part 128 as viewed in FIG. 5. This movement is translated to a clockwise movement of the arm 106 about its upper end 110 by pressure of the compression spring 142 upon the arm. This movement causes a reduction in braking pressure of brake shoe 100 upon the surface 96 of the drum until the pressure is completely removed. The full outline positions of FIG. 5 corresponds to the chain-dotted outline positions of FIG. 4. The chain-dotted outline positions of FIG. 5 are the final positions upon removal of brake shoe 100 from surface 96.

Upon the demand for the conductor becoming lessened, the link 120 moves downwardly together with the link 118 under the force of the spring 88. This results in the movement of the arm 106 towards the brake engaged position with the shoe 100 engaging the drum. After this, the arm 108 moves back to place the shoe 102 in braking engagement with the drum. This reverse movement is exactly opposite to that for removing the shoes from the drum as described above.

As shown by the above embodiment, the cradle according to the invention is provided with a brake release actuator, which is constructed so as to enable the braking pressure by one brake shoe to be reduced and then to be completely removed before pressure of the other brake shoe so that there is a substantial control of braking pressure dependent upon the demand for the conductor being fed from the reel 32. Thus any sudden increase or decrease in braking conditions is avoided so that the tension in the conductor as it is being fed from the reel at different demand speeds does not vary abruptly. Because of this, the tension in the conductor is maintained more constant than would be possible using a conventional braking arrangement in which all the friction surfaces are removed simultaneously. The tension in the twisted pair of conductors is thus maintained more constant along its length, thereby reducing the tendency for the conductors to twist more tightly together in some places than in others. Hence with the use of a cradle according to this invention, the electrical characteristics of the twisted pair, and thus of a cable formed with a core of such twisted pairs, are maintained more constant than would be possible with a cradle of conventional construction. In particular, the mutual capacitance between conductors in a cable core, is maintained more constant which is desirable because mutual capacitance is a primary design requirement.

Further to this, the braking arrangement is constructed in such a way as to enable the flyers to sweep around the cradle structure without hindrance. This is partly because of the location of the arms 106 and 108 with one of the shoes 102 located within the confines of the brake drum. Also, the disposition of the links 118 and 120 with their pivotal position at the outermost location from the spindle axis, enables a compact design of the total mechanism.

What is claimed is:

1. A cradle for a twisting machine for filamentary material comprising:

a reel spindle for a reel of filamentary material and rotatably mounted upon a support and a tensioning device for the material as it is drawn from the reel, the tensioning device comprising:

a brake drum rotatable with the spindle and having inner and outer cylindrical brake surfaces;

first and second brake shoes disposed for braking engagement, the first shoe with the inner and the second shoe with the outer brake surface, the shoes mounted upon first and second brake arms respectively to move the shoes towards and away from their braking surfaces;

a rotatable tensioning pulley;

biassing means to urge the pulley and its axis in one direction of movement and to urge pivotal movement of the first and second brake arms to hold the shoes normally in brake engaged positions with the braking means, the pulley being movable in the opposite direction against the biassing means; and a brake release actuator operably disposed between the pulley and the arms and comprising a brake release link pivotally movable about either of two relatively offset axes and a brake operating link, the actuator operable when the pulley then moves in said opposite direction and with the links connected and relatively inclined to subject the release link to a component of load causing it to pivot primarily about a first of the axes to move the first brake arm and its brake shoe from its brake engaged position and then to pivot primarily about the second axis to move the second brake arm and its brake shoe from its brake engaged position.

2. A cradle according to claim 1 wherein the brake arms are substantially parallel and locate the brake shoes in opposed brake engaged positions, one on the inside and the other outside the brake drum.

3. A cradle according to claim 2 wherein the brake arms, the brake release link and the brake operating link operably move in substantially parallel planes.

4. A cradle according to claim 3 wherein the pulley is movable with and against the biassing means on a pulley support arm having a pivotal movement centred upon the reel spindle axis, the release link and operating link subtend an acute angle between them, with the connection between the links lying at a radially outer position of the actuator relative to the axis of the reel spindle.

5. A cradle according to claim 4 wherein a pivot pin has one part which is secured to the brake release link and provides the first pivotal axis, the pin having another part extending eccentrically from the one part, the other part providing the second pivotal axis and the first arm pivotally mounted upon the other part, and the actuator also comprises a control link for the second arm, the control link having a pivotal connection to the second arm and pivotally joined to said one part of the pivot pin to pivot around the second axis to move the second arm and brake shoe from the brake engaged position simultaneously with the pivoting of the release link primarily about the second axis.

6. A cradle according to claim 1 wherein the biassing means is adjustable to vary its resistance to movement of the tensioning pulley in said opposite direction.

7. A cradle according to claim 6 wherein the biassing means comprises a tension spring operably connected at one end to the tensioning pulley and the other end having an adjustable position by which the spring length may be adjusted.

* * * * *